US008684719B2

(12) United States Patent
Lupke et al.

(10) Patent No.: US 8,684,719 B2
(45) Date of Patent: Apr. 1, 2014

(54) DIE TOOLING FOR EXTRUDING TUBULAR PRODUCT

(76) Inventors: Manfred A. A. Lupke, Thornhill (CA); Stefan A. Lupke, Thornhill (CA)

( * ) Notice: Subject to any disclaimer, the term of this patent is extended or adjusted under 35 U.S.C. 154(b) by 698 days.

(21) Appl. No.: 12/813,883

(22) Filed: Jun. 11, 2010

(65) Prior Publication Data

US 2010/0316754 A1 Dec. 16, 2010

(30) Foreign Application Priority Data

Jun. 11, 2009 (CA) ..................................... 2668518

(51) Int. Cl.
*B29C 47/20* (2006.01)
*B29C 47/26* (2006.01)

(52) U.S. Cl.
USPC .................... 425/133.1; 425/380; 425/382 R; 425/463; 425/467

(58) Field of Classification Search
USPC .................. 425/133.1, 380, 382 R, 463, 467
See application file for complete search history.

(56) References Cited

U.S. PATENT DOCUMENTS

| 3,461,501 A | 8/1969 | Stewart |
| 4,081,232 A | 3/1978 | Pemberton et al. |
| 4,687,430 A | 8/1987 | Morris et al. |
| 5,620,714 A | 4/1997 | Veen |
| 5,667,818 A | 9/1997 | Guillemette |
| 5,718,927 A | 2/1998 | Ohta et al. |
| 7,588,708 B2 | 9/2009 | Dohmann et al. |
| 8,043,082 B2 * | 10/2011 | Neubauer ................. 425/133.1 |

FOREIGN PATENT DOCUMENTS

| CA | 2419703 A1 | 8/2004 |
| DE | 102004052055 A1 * | 4/2006 |
| EP | 0834386 A1 | 4/1998 |
| EP | 1069981 A1 | 1/2001 |
| EP | 1215032 A1 | 6/2002 |
| EP | 1911565 A2 | 4/2008 |
| WO | 2004062884 A1 | 7/2004 |
| WO | WO 2008017496 A1 * | 2/2008 |

* cited by examiner

Primary Examiner — Yogendra Gupta
Assistant Examiner — Joseph Leyson

(57) ABSTRACT

Die tooling is formed by forming a series of passages extending in the length of the tooling where each passage has a circumference defined within a body member of the tooling. Preferably the passages are primarily formed using a drilling procedure. The passages define a predetermined pattern of outlets adjacent the extrusion outlet or outlets. The passages between the inlets and outlets can be formed in a series of connected body members with each passage extending through each body member. Die tooling of this design is more robust and cost effective to manufacture.

13 Claims, 4 Drawing Sheets

DIE TOOLING FOR EXTRUDING TUBULAR PRODUCT

FIELD OF THE INVENTION

The present application relates to extrusion equipment, and in particular die tooling used to extrude tubular product.

BACKGROUND OF THE INVENTION

Tubular plastic product is extruded using a die head connected to a supply of molten plastic with the die head applying pressure and advancing the molten plastic to the die tooling located at the discharge outlets of the die head. Die tooling is used to receive the molten plastic and guide the molten plastic to an extrusion outlet. In the die tooling for the extrusion of tubular product, the die tooling typically includes an outer cylinder member in cooperation with a coaxial inner cylindrical member whereby a cylindrical extrusion passage is defined or a multiple of this there between. At the downstream end of the die tooling, a restrictor is typically provided that defines a restricted extrusion outlet. Where the tubular product is a double walled tubular product, a second die head passage is used and a second extrusion passage defined by a third cylindrical member is provided in the die tooling. The molten plastic is provided to a second extrusion outlet typically located downstream of the first extrusion outlet.

Die tooling for extruding single or double wall pipe is expensive to manufacture and requires the use of spiders to interconnect the various cylindrical components and maintain a particular relationship there between. These spiders are located in the flow stream of the molten plastic and are designed to minimize disruption of the flow of plastic. These spiders are of a specialized shape and serve to mechanically connect the extrusion sleeve holes for air type members. Assembly of the components to reduce variations also requires care.

In addition to the die tooling being relatively costly to manufacture and assemble, it may also be vulnerable to damage. If excess pressures occur in any of the various extrusion passages, the actual die tooling can be distorted and damaged.

The present invention provides an alternative arrangement that has been found effective in use and has certain advantages over the accepted technology.

SUMMARY OF THE INVENTION

Die tooling for controlling the distribution of molten plastic between a die head and an extrusion outlet for forming of continuous tubular plastic product according to the present invention comprises a series of drilled passages extending in a length of the die tooling with spaced inlets to the passages provided at the die head for receiving molten plastic under pressure. The drilled passages form a predetermined pattern of passage? outlets adjacent and upstream of the extrusion outlet. The extrusion outlet is defined between an interior wall and an exterior wall for extruding molten plastic that forms the tubular plastic product.

According to an aspect of the invention the passages converge from the inlets towards said predetermined pattern of passage outlets.

According to a preferred aspect of the invention, the series of passages are divided into a first series of passages and a second series of passages and the extrusion outlet includes a first extrusion outlet associated with the first series of passages and a second extrusion outlet associated with the second series of passages. The tubular plastic product is a double walled tubular plastic product.

According to an aspect of the invention the double walled tubular plastic product is a corrugated product having an inner wall of consistent cross section and an outer corrugated wall connected to the inner wall at selected points along the product.

In yet a further aspect of the invention, the corrugated product has an elongated cross section.

In yet a further aspect of the invention, the elongated cross section is defined by said predetermined pattern and includes a generally straight base portion and curved end portions interconnected by a curved top portion.

In yet a further aspect of the invention, the series of passages is greater than ten passages.

According to yet a further aspect of the invention, the outlets of the passages feed a common blending chamber that is restricted at one end thereof by a restrictor to form the uniform extrusion outlet. If the passages are divided into a first series and a second series of passages, then two blending chambers will be provided one for each layer of plastic.

In yet a further aspect of the invention, the passages between the inlets and outlets are interconnected by a common connecting ring allowing for limited flow of molten plastic between passages.

According to yet a further aspect of the invention, the die tooling includes at least two connected body portions and the passages are drilled in the body portions with each body portion including a plurality of passages. If a given passage has distinct segments at different angles, a split in the tooling can be provided at junction points with an enlarged accumulation area at the junction to provide better flow.

The invention also includes die tooling for extruding tubular product comprising an upstream end for connection with a die head and a downstream end for outputting a moldable tubular extrudate through a die outlet. The die tooling at the upstream end includes a series of individual passages extending in the length of the die tooling with the passages each receiving molten plastic from the die head and guiding a stream of plastic towards the downstream end. Each individual passage adjacent the downstream end includes an outlet port with the outlet ports being positioned to distribute the streams of plastic in a pattern for forming the moldable tubular extrudate. The series of outlet ports all provide molten plastic to a tubular blending chamber that is restricted at one end thereof to form the die outlet through which molten plastic is extruded.

According to an aspect of the invention, the individual passages are formed in a die body arrangement.

According to yet a further aspect of the invention, each individual passage is at least partially formed by a drilling procedure through the die body arrangement.

According to yet a further aspect of the invention, the individual passages at the tubular blending chamber form a non-circular pattern.

An important advantage of the present die design is the stability with respect to internal melt pressure as the different flow bores are through the body of the die tooling.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
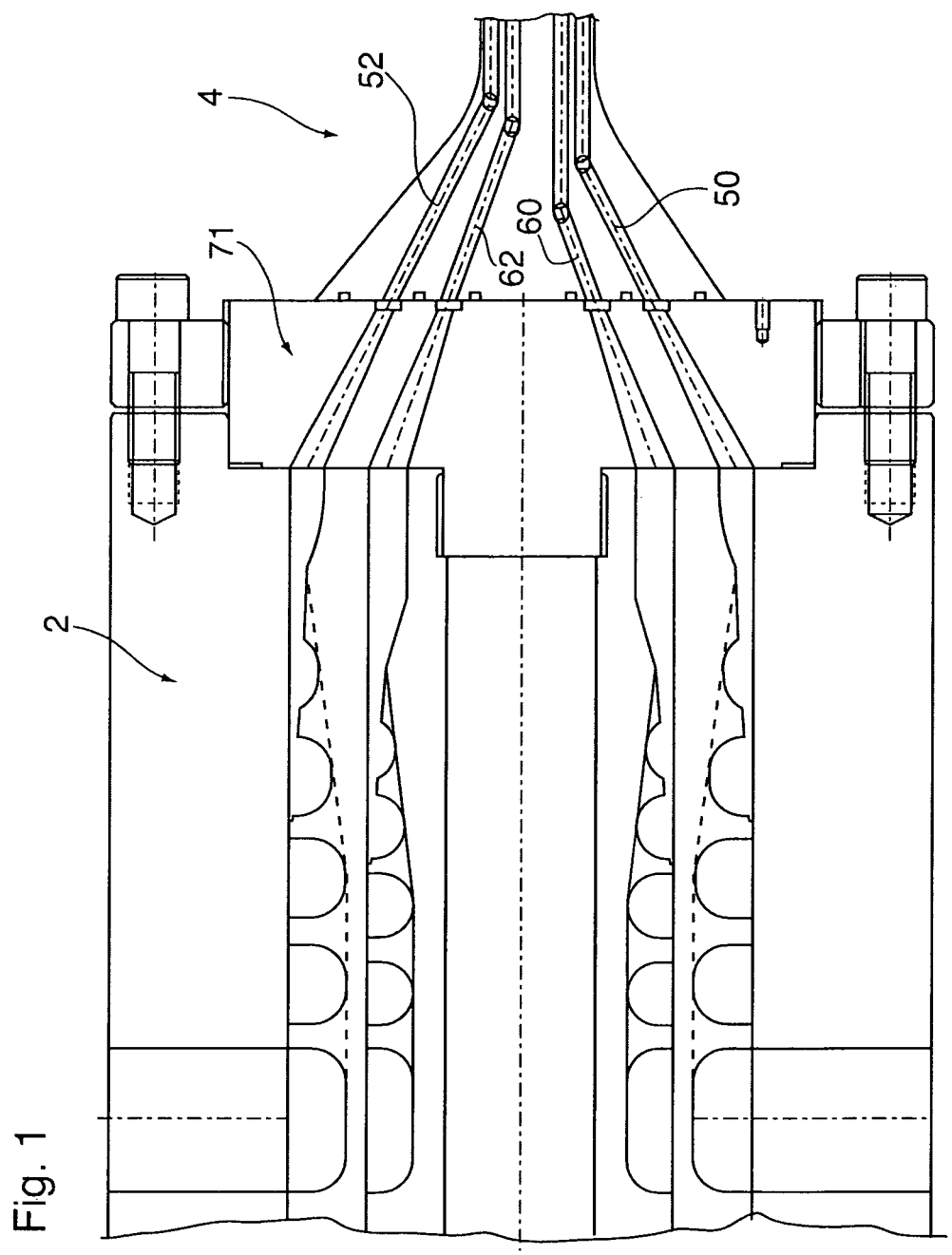
FIG. 1 is a partial view of the apparatus showing the die head and a portion of the die tooling connected to an output of the die head.
Figure 2:
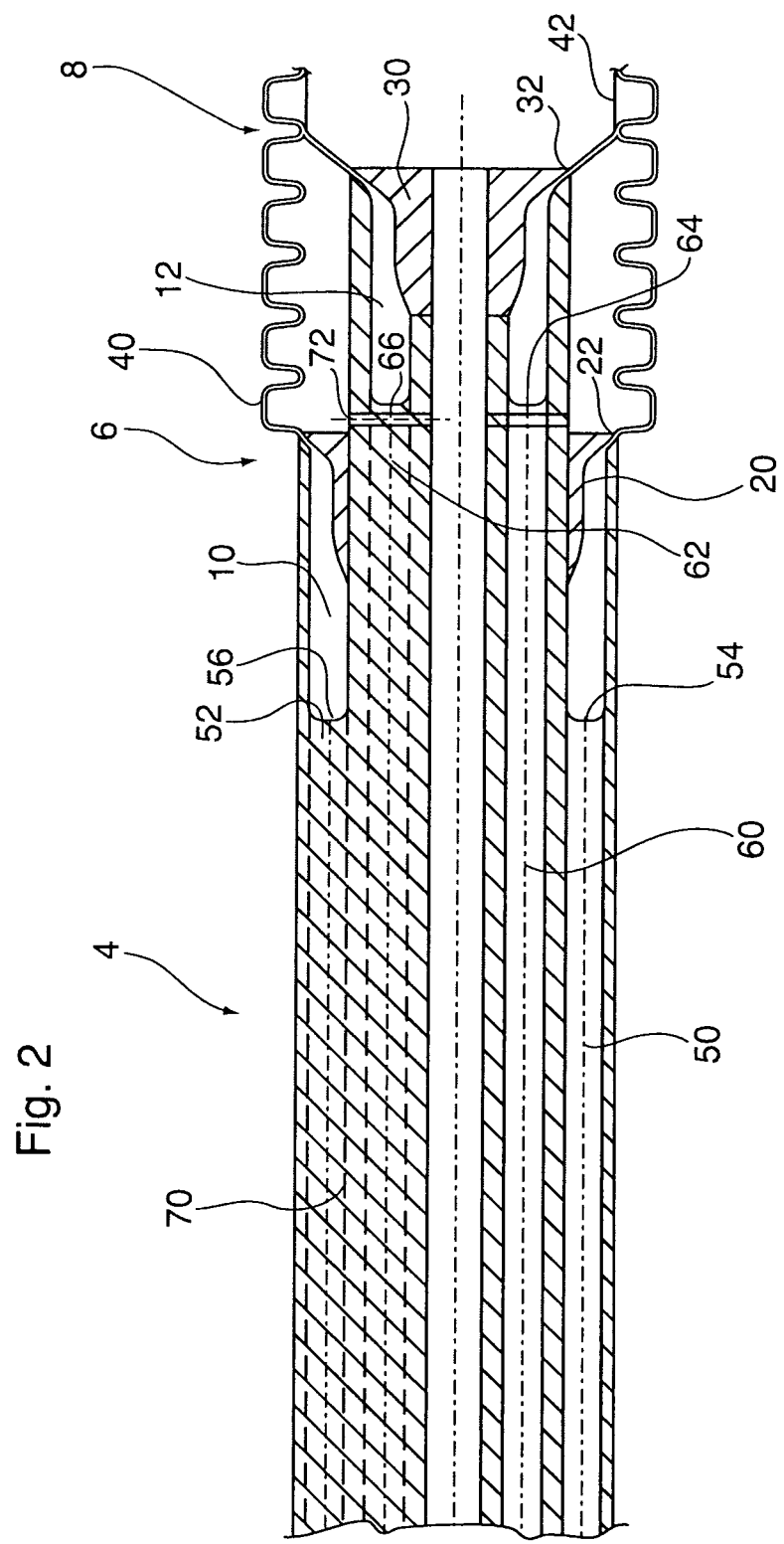
FIG. 2 is a partial sectional view through the die tooling showing the individual passages and the extruding of plastic to form a double walled corrugated pipe-type product.

The extrusion equipment shown in FIGS. 1 and 2 includes the die head 2 connected to the die tooling 4 with the die tooling including extrusion outlets 6 and 8. The die head is connected to suitable supplies of plastic, and in the illustrated embodiment, two separate extruders are shown. The die tooling includes a first series of passages shown as 50 and 52 in the sectional view of FIG. 1, however, there are additional passages (see FIG. 3) preferably drilled through the die tooling with an inlet of the passages connected to the die head. The outlets 54 and 56 of the passages 52 and 54 are shown in FIG. 2 and form part of the downstream end of the die tooling. A second series of passages 60 and 62 are shown in FIG. 1 with these passages extruding an inner wall of the extruded corrugated pipe shown at the downstream end of the die tooling. The passages 60 and 62 again include inlets associated with the die head for receiving molten plastic and guiding the molten plastic to the downstream end of the die tooling. Passage 60 includes an outlet 64 and passage 62 includes the outlet 66.

The outlets of the passages 50, 52, 60 and 62 are positioned at the downstream end of the die tooling and the outlets open onto blending chambers shown as 10 and 12. The blending chamber 10 is associated with the first series of passages 50 and 52 and the blending chamber 12 is shown with the second series of passages 60 and 62. The blending chambers are provided at the downstream end of the die tooling and restrictors 20 and 30 are provided for forming of the extrusion gaps 22 and 32. These restrictors are added to the die tooling and are separate components.

From a review of FIG. 2 it can be seen that a large portion of the die tooling 4 is formed in the one piece body member 70. The one piece body member 70 preferably has the series of passages drilled through the length of the body member, and adjacent passages are integrally connected by the body member 70. This provides excellent strength with respect to the die tooling and it also simplifies the manufacture thereof. The blending chambers 10 and 12 are preferably formed by machining recesses in the ends of the die tooling.

The die tooling 4 can be made of a number of connected body members similar to body member 70. One such additional body member is shown as 71 in FIG. 1. This body member 71 also includes the series of passages and these passages preferably drilled through the member. Some shaping of these passages, typically adjacent the inlets and outlets can also be provided to improve flow characteristics. Body members 70 and 71 can be mechanically secured and appropriate seals provided at the abutment of these two body members.

With the die tooling as shown in FIGS. 1 and 2, the assembly of the die tooling is simplified as the precision of the passages is defined at the time of forming of the passages. The body members continue to be inherently strong as the circumference of each passage is defined within a single body member.

Although the die tooling as shown in FIGS. 1 and 2 is illustrated as a number of connected components, the components are connected along the length of the die tooling. It is also possible to divide the die tooling horizontally if necessary. It is certainly preferred to have a series of connected single body members with each body member including all of the passages. An important aspect of the invention is to have a number of passages formed in a single body member with the passages extending through the body member. With this arrangement, the spacing of the passages can be relatively close to each other, and preferably passages at the upstream end of the blending chambers are also of a predetermined shape according to the product to be extruded. The pattern of the inlets of the passages relative to the pattern of the outlets of the passages will normally vary dramatically.

Figure 3:
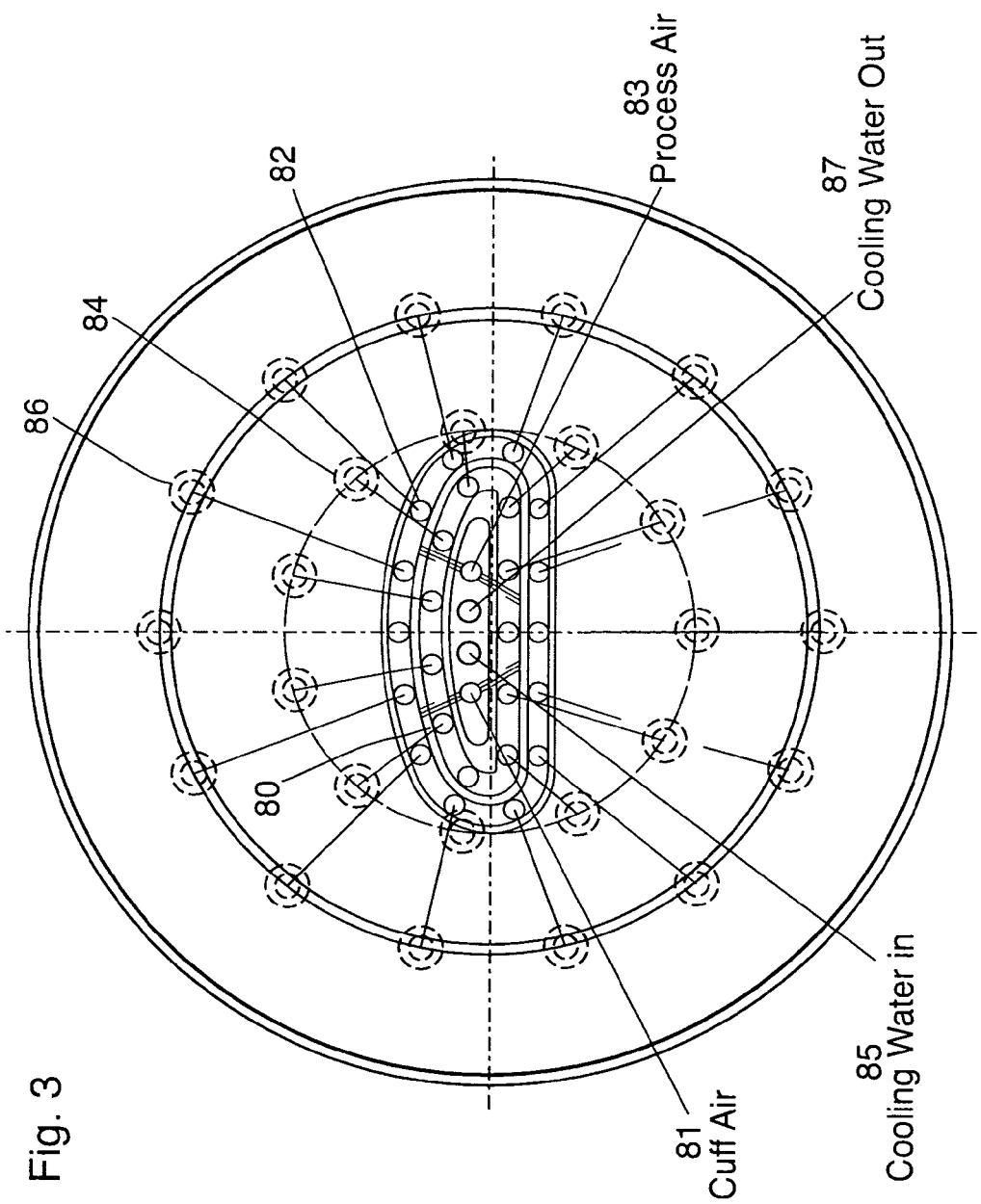
FIG. 3 is an end view of the die tooling without the restrictors provided at the outlets to illustrate a first series of passages and a second series of passages through the die tooling.

This aspect of the invention can be seen in FIG. 3, where a first series 80 of passages are shown with this first series eventually forming an inner wall of a corrugated product. This first series 80 has a predetermined pattern of the outlet of the passages to define a generally flat base portion, curved end portions and a curved top portion. A second series 82 of the outlets of the passages is shown that forms an outer wall and is of a configuration corresponding to the first predetermined pattern but slightly larger and coaxial therewith. The particular pattern described with respect to FIG. 3 is at the blending chambers, whereas the upstream end of the first series of passages has a circular configuration as generally shown at 84. These are the inlets to the passages provided at the die head. The second series 82 also has an associated pattern 86 which is of a circular configuration, and again is the inlet to these passages provided at the die head. As can be appreciated from a review of FIG. 3, the passages of the die head can be relatively widely spaced and these passages converge and narrow, and provide a close spacing of the outlets of the passages at the blending chambers.

A series of processing ports 81, 83, 85 and 87 are shown in FIG. 3. Ports 81 and 83 allow processing air to be distributed through the die tooling to the extrusion outlet. Ports 85 and 87 allow cooling water to circulate and remove excess heat. Automatic controls for controlling and adjusting these ports can be used.

As can be appreciated from a review of FIG. 2, the converging of the passages can occur at the upstream end of the die tooling, followed by a longer generally parallel guiding of the plastic flow to the blending chambers. This provides for consistency in the plastic prior to exiting after the blending chambers.

Figure 4:
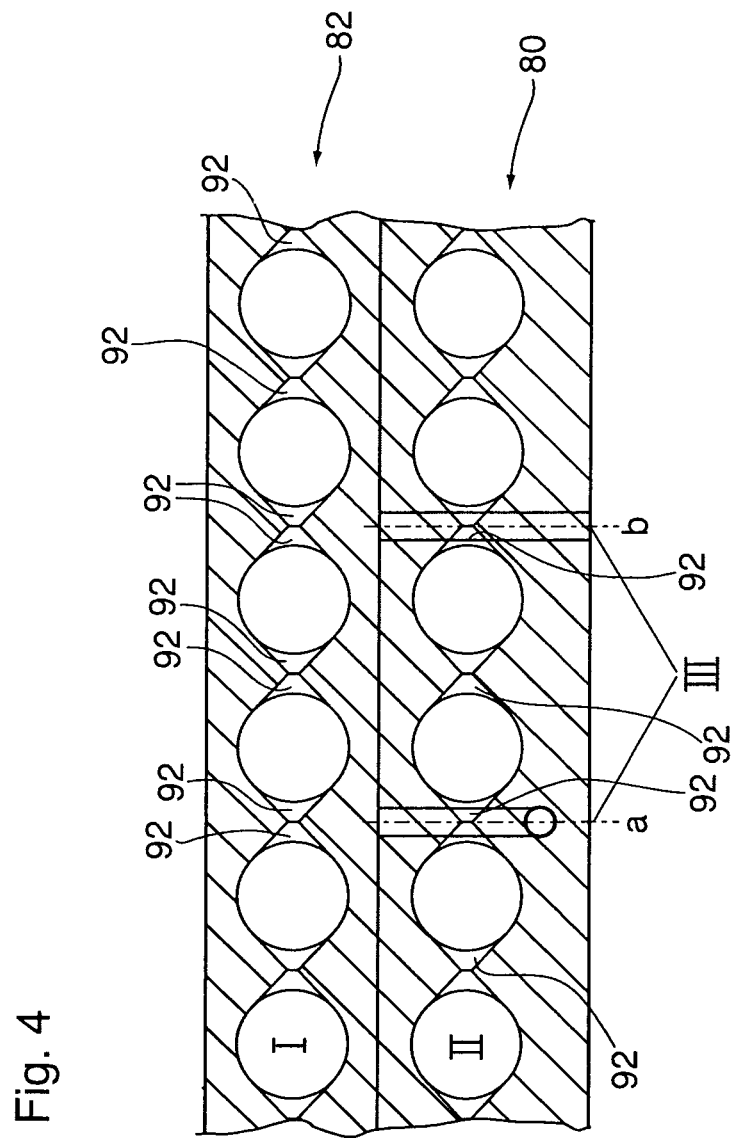
FIG. 4 is a partial end view showing a number of outlets adjacent blending chambers.

A preferred aspect of the invention is shown in FIG. 4, where the outlets of the passages at the blending chamber have been modified to provide a diverging of the plastic flow as it enters the respective blending chamber. The outlets include V-shaped type recesses 92 either side of the outlets such that adjacent outlets are generally connected. This provides for improved continuity of the plastic flow within the blending chamber prior to discharge through the extrusion outlet.

As found in other extrusion equipment, the die tooling preferably includes a central passageway as well as other passageways through the die tooling for effective cooling thereof. These passageways can also be easily machined in the die tooling.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. Die tooling for controlling the distribution of molten plastic between a die head and an extrusion outlet for forming continuous tubular plastic product, said die tooling comprising a die body having a series of drill hole passages through said die body with said series of drill hole passages extending in a length of said die tooling with spaced inlets to said drill hole passages at said die head for receiving molten plastic under pressure;

said spaced inlets being positioned in a circular manner about a longitudinal axis of said die head;

said drill hole passages forming a predetermined pattern of passage outlets arranged in a non-circular manner adjacent and upstream of said extrusion outlet;

said extrusion outlet being defined between an interior wall and an exterior wall for extruding molten plastic forming said tubular plastic product;

said extrusion outlet in cross section defining an elongate section having a generally straight base portion, and curved end portions interconnected by a curved top portion;

said non-circular pattern of passage outlets being positioned at an upstream end of said extrusion outlet and spaced about said elongate section.

2. Die tooling as claimed in claim 1 wherein said series of drill hole passages are divided into a first series of outer passages and a second series of inner passages and said extrusion outlet includes a first extrusion outlet associated with said first series of passages for forming an outer wall and a second extrusion outlet associated with said second series of passages for forming an inner wall of a double walled tubular plastic product; and wherein each of said extrusion outlets in cross section are of said elongate section.

3. Die tooling as claimed in claim 1 wherein said outlets of said passages all open onto a common blending chamber that is restricted at one end thereof by a restrictor to form said extrusion outlet.

4. Die tooling as claimed in claim 3 wherein said passages between said inlets and said outlets are interconnected by a common connecting ring accommodating flow of molten plastic between passages.

5. Die tooling as claimed in claim 3 wherein said die tooling includes at least two connected body portions and said drill hole passages pass through each body portion.

6. Die tooling as claimed in claim 1 wherein said series of passages is greater than 10 passages.

7. Die tooling for extruding tubular product comprising an upstream end for connection with an extruder outlet and a downstream end for outputting a moldable tubular extrudate through a die outlet, said die tooling at said upstream end including at least one series of individual passages extending in the length of said die tooling with each series of passages having inlets receiving molten plastic from said die head and guiding a stream of plastic inwardly towards said downstream end;

said inlets of each series of passages defining a circular pattern;

each series of passages adjacent said downstream end including outlet ports being positioned in a non-circular elongate pattern to distribute the streams of plastic in said non-circular elongate pattern for forming the moldable tubular extrudate; each series of passages providing molten plastic to a blending chamber that is restricted at one end thereof to form said die outlet through which molten plastic is extruded; and wherein each blending chamber and die outlet are of a non circular elongate cross section.

8. Die tooling as claimed in claim 7 wherein said series of passages are formed in a die body arrangement.

9. Die tooling as claimed in claim 7 wherein one of said series of passages form an inner pattern for forming a first inner wall of an extruded product and a second one of said series of passages form an outer pattern for forming an outer wall of the extruded product.

10. Die tooling as claimed in claim 9 wherein said die tooling has an elongate axis and said series of individual passages are positioned about said elongate axis.

11. Die tooling as claimed in claim 10 wherein said one series of passages form an inner tubular elongate pattern having a generally flat base, opposed curved ends and a curved top, and said second one of said series of passages form a corresponding outer tubular elongate pattern aligned about said inner tubular elongate pattern.

12. Die tooling as claimed in claim 11 wherein said tubular blending chamber and said series of passages are all formed as part of a die body.

13. Die tooling as claimed in claim 7 wherein said individual passages between said die head and said blending chamber are interconnected by at least one continuous connecting passage.

* * * * *